US006957941B2

(12) United States Patent
Hart et al.

(10) Patent No.: US 6,957,941 B2
(45) Date of Patent: Oct. 25, 2005

(54) METHOD AND APPARATUS FOR BUFFERING A FLOW OF OBJECTS

(75) Inventors: Colin R. Hart, Klive, IA (US); Kenneth M. Welborn, Charlottesville, VA (US)

(73) Assignee: F.R. Drake Company, Waynesboro, VA (US)

( * ) Notice: Subject to any disclaimer, the term of this patent is extended or adjusted under 35 U.S.C. 154(b) by 345 days.

(21) Appl. No.: 10/143,860

(22) Filed: May 14, 2002

(65) Prior Publication Data

US 2002/0189201 A1 Dec. 19, 2002

Related U.S. Application Data

(60) Provisional application No. 60/290,342, filed on May 14, 2001.

(51) Int. Cl.[7] ............ B65G 17/24

(52) U.S. Cl. ............ 414/331.03; 198/465.1

(58) Field of Search ............ 414/331.03, 279, 414/591, 940; 198/465.2, 465; 104/107, 118

(56) References Cited

U.S. PATENT DOCUMENTS

| | | | | |
|---|---|---|---|---|
| 2,571,283 A | | 10/1951 | Nicholson | |
| 3,708,051 A | * | 1/1973 | Dato et al. | 198/345.3 |
| 3,722,741 A | | 3/1973 | Mojden | |
| 3,785,475 A | * | 1/1974 | Maynard | 198/345.3 |
| 3,805,942 A | * | 4/1974 | Auernhammer | 198/341.03 |
| 3,880,301 A | | 4/1975 | Reilly | |
| 4,000,709 A | | 1/1977 | Mojden | |
| 4,137,604 A | | 2/1979 | Sandberg et al. | |
| 4,180,154 A | | 12/1979 | Anderson | |
| 4,236,855 A | | 12/1980 | Wagner et al. | |
| 4,558,779 A | | 12/1985 | Schmitt et al. | |
| 4,768,642 A | | 9/1988 | Hunter | |
| 4,807,741 A | | 2/1989 | Simelunas et al. | |
| 4,921,398 A | | 5/1990 | Fluck | |
| 4,947,978 A | * | 8/1990 | Rhodes | 198/341.02 |
| 4,969,790 A | | 11/1990 | Petz et al. | |
| 5,346,050 A | | 9/1994 | Mojden et al. | |
| 5,431,289 A | * | 7/1995 | Hoffman | 209/638 |
| 5,682,647 A | * | 11/1997 | Leifeld | 19/159 A |
| 5,884,749 A | | 3/1999 | Goodman | |
| 5,960,927 A | * | 10/1999 | Bahr | 198/347.1 |
| 6,019,213 A | | 2/2000 | Schubert | |
| 6,019,214 A | * | 2/2000 | Herronen et al. | 198/465.1 |
| 6,052,969 A | | 4/2000 | Hart et al. | |
| 6,099,452 A | * | 8/2000 | Hoza et al. | 493/416 |
| 6,130,437 A | * | 10/2000 | Cerny et al. | 250/559.4 |
| 6,322,316 B1 | | 11/2001 | Hart et al. | |
| 6,438,925 B1 | * | 8/2002 | Straub | 53/244 |
| 6,644,461 B1 | * | 11/2003 | Imbert et al. | 198/419.2 |

OTHER PUBLICATIONS

U.S. Appl. No. 10/143,861, Hart et al.

* cited by examiner

*Primary Examiner*—Eileen D. Lillis
*Assistant Examiner*—Charles A. Fox
(74) *Attorney, Agent, or Firm*—Berenato, White & Stavish, LLC

(57) ABSTRACT

A buffer device for buffering a flow of stacks of discrete objects between a stacking machine and a packaging machine is disclosed which buffer includes a plurality of individual trays mounted on carriers which carriers are mounted on a frame and driven about the periphery of the frame by a drive. A first number of stacks of objects is placed on a first number of carriers on a first side of the frame and a second number of stacks are removed from a second number of carriers on a second side of the frame where the first number can be greater than, less than or equal to the first number. The carriers clamp onto a continuously moving drive belt in a manner that allow the drive belt to slip through the carrier clamps when motion of the carriers is obstructed. A method of using the buffer device is also disclosed.

28 Claims, 11 Drawing Sheets

METHOD AND APPARATUS FOR BUFFERING A FLOW OF OBJECTS

CROSS-REFERENCE TO RELATED APPLICATIONS AND CLAIM TO PRIORITY

The present application claims the benefit of U.S. provisional patent application Ser. No. 60/290,342, filed May 14, 2001, the disclosure of which is incorporated by reference.

FIELD OF THE INVENTION

The present invention is directed to a method and apparatus for buffering a flow of stacks of objects, and more specifically, toward a method and apparatus for receiving a first number of stacks of discrete planar objects, such as frozen hamburger patties, from a stacking machine and presenting a second number of those stacks to a packing machine, especially when the first and second numbers are unequal.

BACKGROUND OF THE INVENTION

Frozen hamburgers, chicken patties, sausage patties, and other disk-like food products typically are prepared by a manufacturer on one piece of equipment and then fed into a freezer. After leaving the freezer, they are screened by a metal detector, which detects contaminated patties, and then conveyed to a stacker. The stacker forms the patties into one or more stacks, and the finished stacks are then placed in cases. Because the stacks formed by some stackers can vary in height, and because the number of stacks formed simultaneously by a stacker may be greater than the number of stacks that will fit in a row in a case, the finished stacks are often removed from the stacker and loaded into cases by hand. This manual loading step is labor-intensive, and, due to the presence of a human element, highly variable.

The problem of forming uniform stacks of patties is addressed by the novel stacking machine disclosed in the co-pending application entitled "Method and Apparatus for Stacking Discrete Planar Objects" filed concurrently herewith and assigned to the assignee hereof. The disclosure of that application is hereby incorporated by reference. However, as with many prior art devices, the subject stacker simultaneously forms more stacks than will fit in one row of a typical case. For example, in a preferred embodiment, the subject stacker receives four rows of frozen patties from a conveyor belt and simultaneously forms four stacks of patties. Cases of patties, however, can often accommodate only three stacks of patties per row, or possibly five stacks or more.

This problem could be addressed by adjusting the stacking machine to form only three stacks of patties at a time, but the reduction from four rows to three rows represents a twenty-five percent decrease in efficiency. Human packers can also address this problem by packing stacks one at a time and positioning each stack as required in a given case. However, as mentioned above, it would be desirable to fully automate the stacking and packing processes to provide greater consistency and to reduce costs.

In addition, not all cases are packed in the same manner. Some cases may hold only two rows of patties, for example, and it would be useful to have a machine that could be rapidly adjusted to convert four incoming rows of stacks into two outgoing stacks, depending on the product being packaged, or even to accommodate cases that alternate between two stacks per row and three stacks per row. Ideally, the change would be software controlled or require no more than the push of button to make. And, while reducing the number of rows is the general problem faced by the industry, under some circumstances it may be desirable to present more stacks to a packing machine than are provided at one time by a stacker—for example, if the stacker forms four rows of stacks at a time and a certain case requires six stacks in a row. Finally, the machine should be able to function under conditions where the number of incoming rows is equal to the number of outgoing rows and to do so in an efficient manner.

SUMMARY OF THE INVENTION

These and other difficulties are addressed by the present invention which comprises a novel buffering device that receives a first plurality of stacks of objects from a stacking machine and presents a second number of stacks to a packing machine for removal, where the second number may be greater than, less than, or equal to the first number. The invention includes a plurality of trays or similar receptacles sized and shaped to accommodate the stacked objects, which receptacles are mounted on carriers that can be moved between a first location where the stacks are received from a loading device and a second location where the stacks are removed by an unloading device.

In a preferred embodiment, the invention comprises a carousel around which a belt rotates continuously in a path having two generally parallel linear sections connected by curved portions. Each carrier is attached to the belt by a clamp which engages the belt in a jaw-like manner on opposites sides thereof. The clamp is attached tightly enough to cause the receptacle to move with the belt when the path of the carrier is unobstructed, but loosely enough that the belt will slide through the clamp when the path of the carrier is blocked. In this manner, the position of the carriers can be controlled somewhat independently of the positions of the other carriers without the need to provide separate controllers for the clamps on each carrier.

The movement of the receptacles is controlled so that a first number of receptacles is always available when needed to receive a first number of incoming stacks at a first location. The receptacles are then released to a second location from which the stacks are removed in groups of a second number. When the second number is less than the first number, the stacks must be removed at a rate greater than the rate at which the stacks of patties arrive at the carousel, and full carriers are buffered at a location between the first and second locations. When the second number of carriers is greater than the first number, the full carriers are accumulated at the second location until a second number of carriers is present. When the first and second numbers are the same, the carries merely move around the carousel in equally sized groups. While such a buffer can be incorporated into a stacking or packing machine, in the preferred embodiment, it comprises a stand-alone device that is connected between a stacker and a packer, thus allowing greater flexibility for use with different types stacking and packing machines.

In a preferred embodiment, the device further includes sensors for detecting the presence of carriers at different points around the carousel. A proximity sensor mounted near the path of the carriers detects the carriers as they pass. The sensors are operably connected to stops that block the passage of carriers when the stops are in an extended or in a blocking position. Because the carriers are somewhat loosely connected to the drive belt, the drive belt continues to move through the clamp when a carrier is blocked. Other carriers being moved by the belt engage the stopped carrier, and are likewise stopped. When the stop is moved to a releasing position, the carriers that were blocked begin again to move with the belt. A controller connected to the stops controls them so that so that carriers are released from the first stop in groups of a first number and released from the second stop in groups of a second number, where the first number can be greater than, less than or equal to the second number. Alternately, additional sensors can be used to determine whether the carriers are full or empty. When additional sensors are used, the controller releases only full carriers from the first location, and releases only empty carriers from the second location. Thus, with either embodiment, empty carriers are stopped at the first location and filled with stacks of frozen hamburger patties. When the carriers are full, the controller releases the stop to allow the filled group of carriers to pass and the next empty carrier is stopped. The full carriers travel around the carousel until they reach the second stop, which moves into the blocking position to keep the full carriers from passing. The full carriers remain at this location until stacks are removed by a stack transfer mechanism, and empty carriers are then released to travel back to the first location.

In the preferred embodiment, the number of carriers is related to the maximum number of incoming or outgoing rows of patties in a certain way to minimize the number of carriers needed, and this reduces the amount of space occupied by the machine. Applicant has found, for example, that a buffer for use between a stacking machine that produces four rows of patties and a packaging machine that requires three rows of patties as input, needs eleven carriers. By limiting the number of carriers, the width of the buffer can be kept small and the resulting buffer need not be much greater than the width of the stacking machine.

It is therefore a principal object of the invention to provide an apparatus for receiving a first number of stacks of objects at an input location and presenting a second number of stacks of objects at an output location.

It is another object of the invention to provide a method of buffering the flow of stacks of objects between a stacking machine and a packing machine.

It is a further object of the invention to provide an apparatus for matching the output rate of a first machine to the input rate of a second machine.

It is still another object of the invention to provide a carousel having a plurality of selectively positionable receptacles for receiving a plurality of stacks from a first machine and presenting a plurality of stacks to a second machine.

It is still a further object of the present invention to provide a free-standing stack transfer device that receives a first number of stacks of objects at a first location and presents a second, smaller number of stacks of objects at a second location.

It is yet another object of the present invention to provide a free-standing stack transfer device that receives a first number of stacks of objects at a first location and presents a second, larger number of stacks of objects at a second location.

It is yet a further object of the present invention to provide a buffer device that can be configured to accommodate different numbers of incoming stacks and differing numbers of outgoing stacks.

In furtherance of these objects, a method for buffering a flow of stacks of objects from a first location presenting a first number of stacks to a second location adapted to receive a second number of stacks is provided that includes the steps of providing a frame between the first location and the second location which frame has a first position and a second position. A plurality of carriers each adapted to hold a single stack is associated with the frame and a first number of carriers are moved to the first position. The first number of stacks are transferred from the first location to the first number of carriers at the first position, and then the first number of filled carriers at the first position are moved toward the second position. Whenever at least a second number of filled carriers are present at the second location, the stacks from the second number of filled carriers at the second position are removed to the second location. Lastly, empty carriers are returned from the second position toward the first position.

Another aspect of the invention comprises a system for buffering a flow of stacks between a first location and a second location that includes a frame having a first position with an exit end proximate the first location and a second position with an exit end proximate the second location and a drive. A plurality of carriers is supported by the frame and connected to the drive. The device further includes a first stop at the first position exit end, a second stop at the second position exit end, and a controller for actuating the first stop to allow carriers to pass the first location exit end in groups of a first number and for actuating the second stop to allow carriers to pass the second location exit end in groups of a second number.

A further aspect of the invention involves a method for receiving a first number of stacks of discrete objects from a stacking machine and presenting a second number of the received stacks for removal by a stack transfer machine. The method requires a frame having a periphery, a first location on the periphery, and a second location on the periphery, and a drive on the frame. A plurality of carriers adapted to hold a single stack are mounted on the frame and connected to the drive. A first sensor is provided for counting the number of carriers passing a first point and a second sensor is provided for counting the number of carriers passing a second point. A first stop is provided near the first point for preventing empty carriers from passing the first stop, and one stack is received in each of the first number of carriers at the first location. The first number of carriers are released from the first stop, but stopped at a second location by a second stop near the second point that prevents carriers from passing the second location. A second number of stacks is removed from the first number of carriers at the second location, and the second number of carriers are released by the second stop and moved toward the first location.

Yet another aspect of the invention comprises a buffer including a support frame, a platform having a periphery mounted on the support frame, and a guide extending around the periphery. A drive belt is mounted adjacent the platform along the periphery, and a drive is operatively coupled to the drive belt. A plurality of carriers is supported by the platform, each including a first member engaging the guide and a second member engaging the drive belt such that movement of the drive belt moves the carriers about the periphery of the platform. A first sensor is mounted at a first location for counting the number of carriers passing the first location, and at least one stop is provided that can be shifted between a first position in a path of travel of the carriers around the platform and a second position outside the path of travel of the carriers around the platform. A controller operatively coupled to the first sensor controls the position of the at least one stop.

A further aspect of the invention comprises a carrier having a trolley adapted to support a tray for holding stacks of objects. The trolley has a body with a first side and a second side and includes a first wall portion having an end and a second wall portion extending from the end of the first wall portion at an obtuse angle. An axle extends from the first side of the second wall portion and a wheel is rotatably supported by the second wall portion axle. A clamp is mounted on the first side of the first wall portion.

BRIEF DESCRIPTION OF THE DRAWINGS

These and other objects of the invention will become apparent from a reading and understanding of the following detailed description of the invention together with the following drawings of which.

DETAILED DESCRIPTION OF THE PREFERRED EMBODIMENT

Figure 1:
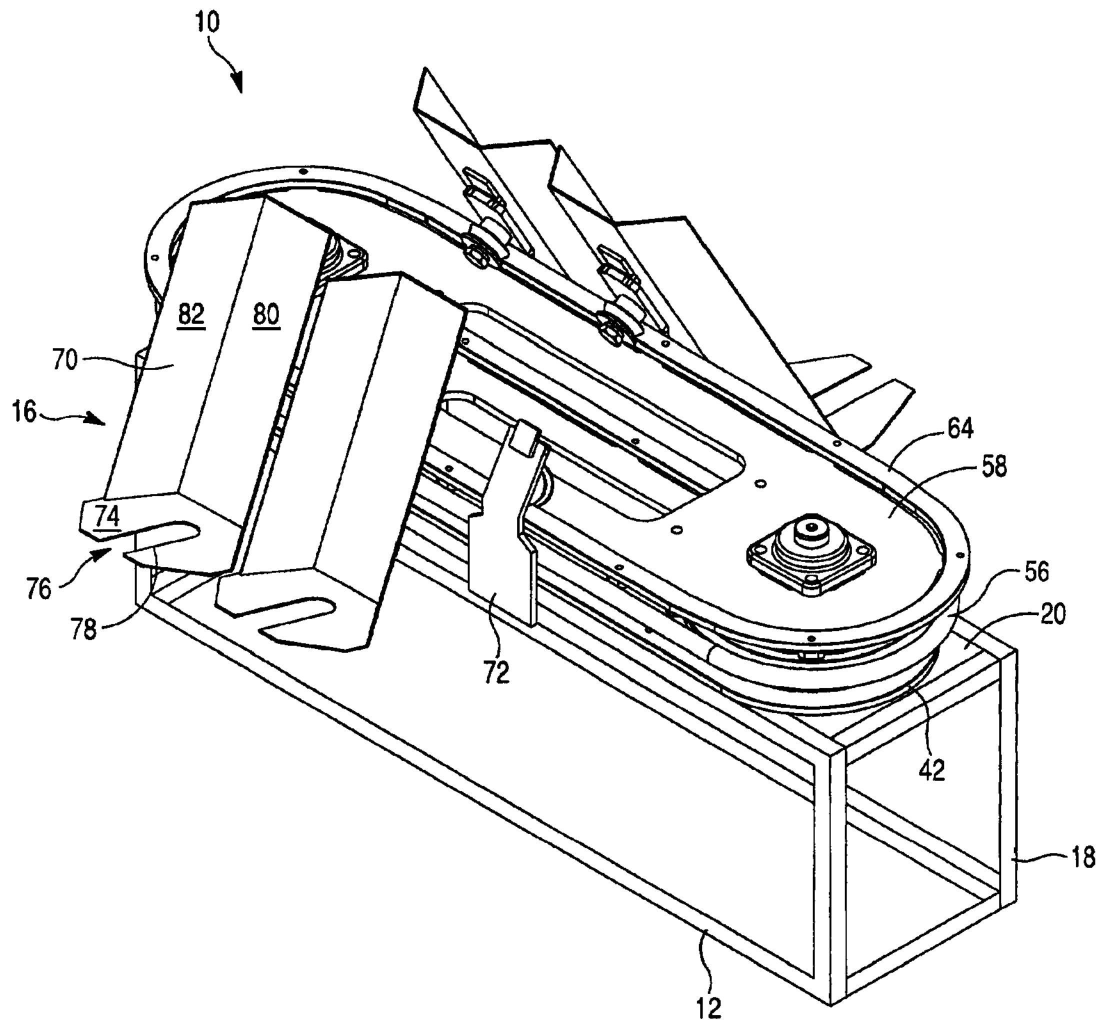
FIG. 1 is a perspective view of a carousel buffer device having a plurality of trays supported on carriers according to the present invention.
Figure 2:
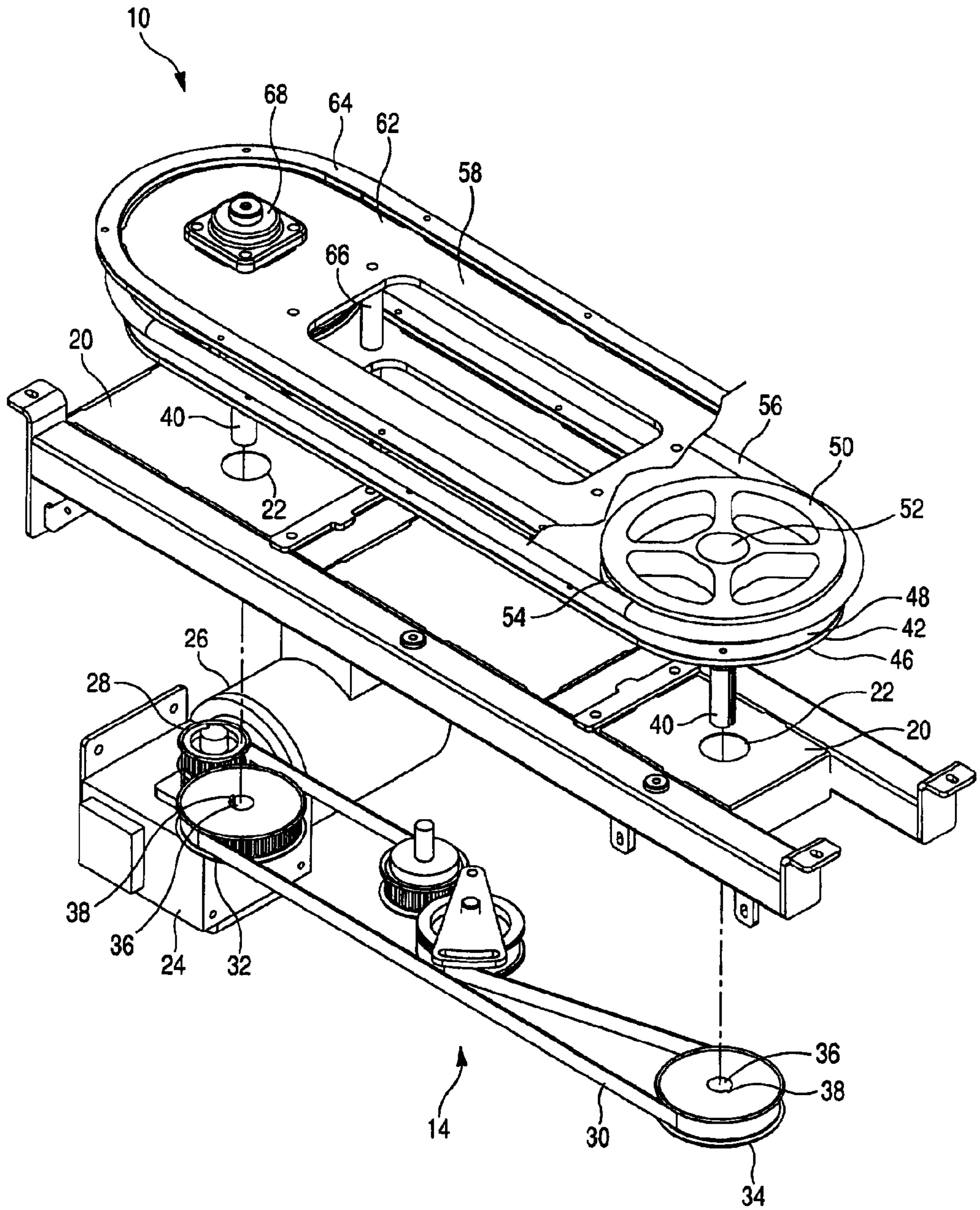
FIG. 2 is an assembly drawing of a portion of the buffer device of FIG. 1 with the carriers and trays removed.

Referring now to the drawings, wherein the showings are for purposes of illustrating a preferred embodiment of the invention only, and not for the purpose of limiting same, FIGS. 1 and 2 illustrate a buffer device designated generally by the numeral 10 which includes a frame 12, a drive 14 and a plurality of carriers 16 supported by the frame 12. Frame 12 includes vertical support portions 18 adapted to support the frame on a horizontal support surface, a generally planar upper support portion 20 that includes first and second openings 22, and a motor support 24 mounted beneath upper planar portion 20.

Drive 14 includes a motor 26 mounted on motor support 24 and operably connected to a drive gear 28 which turns a continuous drive belt 30 about a plurality of flanged wheels, including a first wheel 32 and a second wheel 34. First and second wheels 32 and 34 each include a center opening 36 having a notch 38 for receiving a splined shaft. Two splined shafts 40 extend from center openings 36 upwardly through first and second openings 22 in the frame upper support 20.

Figure 5:
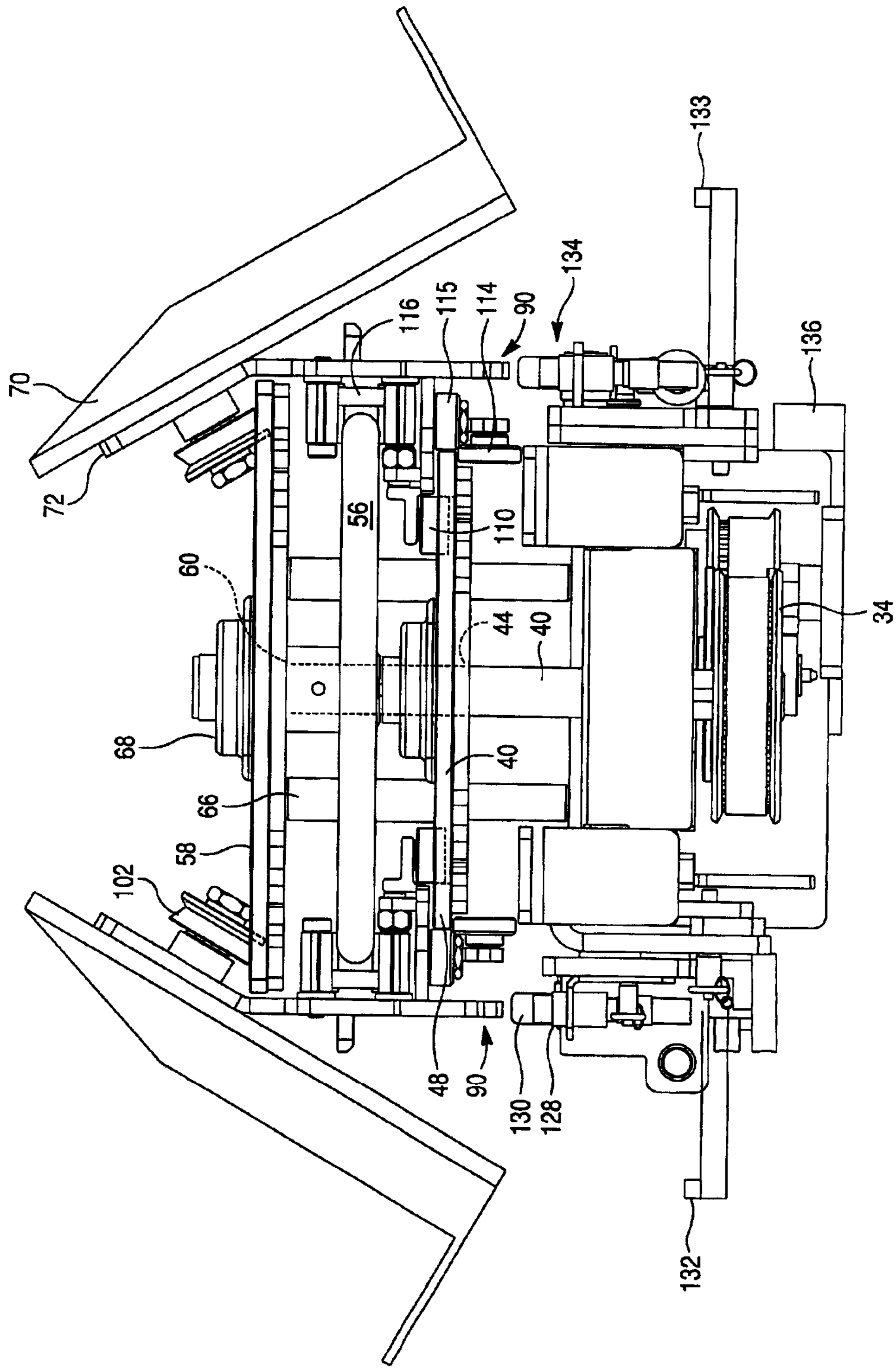
FIG. 5 is a side elevational view of the buffer of FIG. 1.

A bottom plate 42 having first and second openings 44, as best shown in FIG. 5, a peripheral edge 46 and a raised rail 48 running around the peripheral edge is mounted on frame upper support 20 with first and second openings 44 aligned with openings 22 in the frame upper support 20 so that splined shafts 40 extend though these openings. Wheels 50, as best shown in FIG. 2, are mounted on each of the splined shafts which wheels include center openings 52 shaped to receive shafts 40 and peripheral grooves 54 for receiving and holding a drive belt 56. The drive belt 56 preferably has a circular cross section and is formed from a flexible, wear-resistant material, such as urethane.

A top plate 58 having first and second openings 60, a peripheral edge 62 and a raised rail 64 running around the peripheral edge is mounted over bottom plate 42 and spaced apart therefrom by spacers 66, with openings 58 positioned to receive splined shafts 40. Bearings 68 are mounted on top plate 56 to rotatably secure the ends of shafts 40. Thus, motor 26 turns drive gear 28 and causes drive belt 30 to move about first wheel 32 and second wheel 34, which in turn causes splined shafts 40 and wheels 50 mounted thereon to rotate and drive belt 56 about a continuous path between bottom plate 42 and top plate 58. Drive belt 56 preferably has a diameter greater than the width of peripheral grooves 54, so that the belt only contacts the wheels about a small portion, less than 180 degrees, of the belt's circumference.

Figure 4:
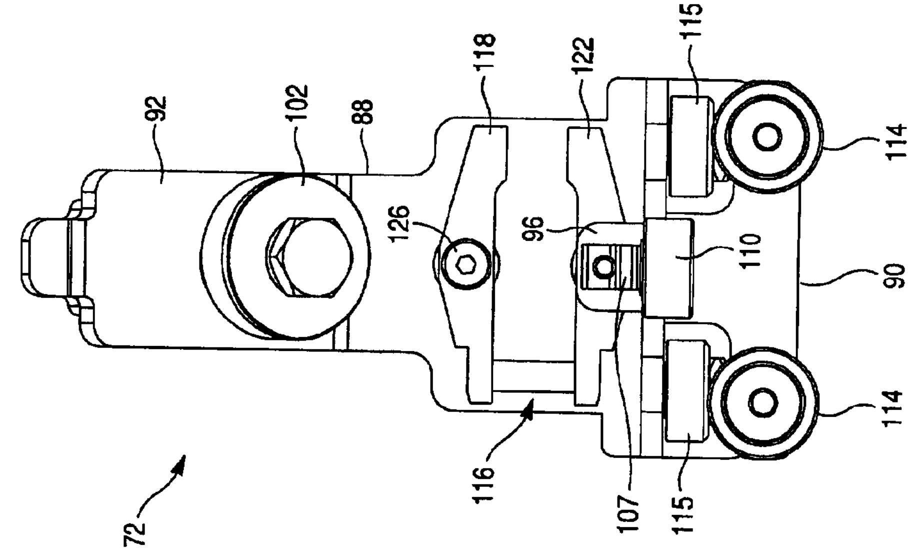
FIG. 4 is a rear elevational view of the carrier of FIG. 3.
Figure 3:
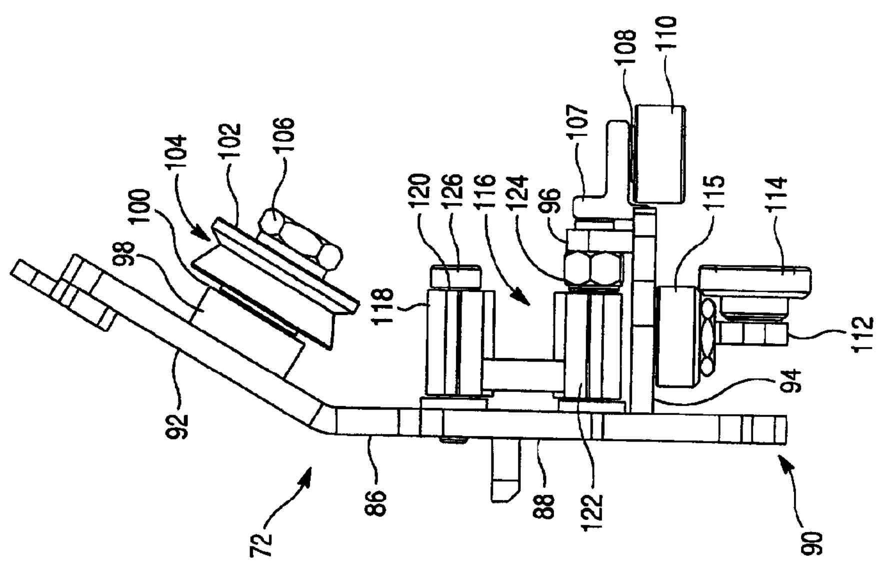
FIG. 3 is a side elevational view of one of the carriers shown in FIG. 1.

FIG. 1 illustrates a plurality of carriers 16 mounted on the top and bottom plates which carriers comprise trays 70 supported by trolleys 72 as best shown in FIGS. 2–4. Each tray 70 includes a bottom wall 74 having a centrally located slot 76 with a slot edge 78, a rear wall 80 and sidewalls 82. The trays 70 are preferably mounted on the trolleys 72 in a manner that allows for easy removal thereof, so that appropriately sized trays 70 can be used for the objects being processed. Each trolley 72, shown in more detail in FIGS. 3 and 4, includes a body portion 86 having a lower portion 88 with a lower end 90 and an upper portion 92 angled with respect to the lower portion 88. A wall 94 projects from body lower portion 88 in the same direction as the angle of the upper portion, and includes a small wall 96 projecting from its end in the direction of angled upper portion 92. A boss 98 is mounted on upper portion 92 and supports a shaft 100 on which a wheel 102 having a V-shaped peripheral notch 104 is rotatably mounted and held in place by a retainer 106. A wheel support 107 is connected to wall 94, and small wall 96 supports two shafts 108 on which first and second guide wheels 110 are mounted for rotation about axes parallel to lower portion 88 of body portion 86. Projections 112 extending from the lower side of wall 94 support two additional guide wheels 114, which guide wheels are mounted for rotation about axes normal to body lower portion 88. Guide wheels 115 are also mounted on the bottom side of wall 94, with axes parallel to body portion 88 and between guide wheels 114 and body portion 88.

A clamp 116 is mounted on body lower portion 88 between guide wheels 110 and 110 notched wheel 102, and includes an upper clamp member 118 pivotably supported on lower body portion 88 by a shaft 120, and a lower clamp member 122 pivotably supported on a shaft 124 extending between lower body portion 88 and small wall 96. Both the upper and lower clamp members are coated with, or preferably formed from, a low-friction, wear resistant material, such as UHMW polyurethane. The angular relationship between the upper and lower clamp members, and hence the distance separating the ends of the clamp members, can be adjusted by pivoting the upper clamp member and fixing it in place with fastener 126.

The mounting of carriers 16 on the upper and lower plates is best shown in FIG. 5, wherein trays 70 are detachably connected to trolleys 72, and the trolleys are arranged such that notch 104 of wheel 102 on the angled upper portion 92 of the trolley fits over an edge of raised rail 64 on the periphery of top plate 58, guide wheels 110 engage the inner edge of raised rail 48 on bottom plate 42, guide wheels 115 engage the outer edge of raised rail 48, and guide wheels 114 engage the underside of bottom plate 42.

The upper and lower members 118 and 122, respectively, of clamp 116 are attached to drive belt 56 by placing the belt between the members and clamping the upper member in place so that a small force is exerted against the belt by the clamp members. The force must be great enough that friction between the clamp 116 and the belt 56 will keep the trolleys 72 fixed with respect to the belt when the path of the trolleys 72 is clear. The force also must be small enough that the frictional force between the belt 56 and the clamp 116 can be overcome by the drive motor to cause the belt to slip through the clamp when movement of one or more of the trolleys 72 is blocked by a stop.

Figure 6:
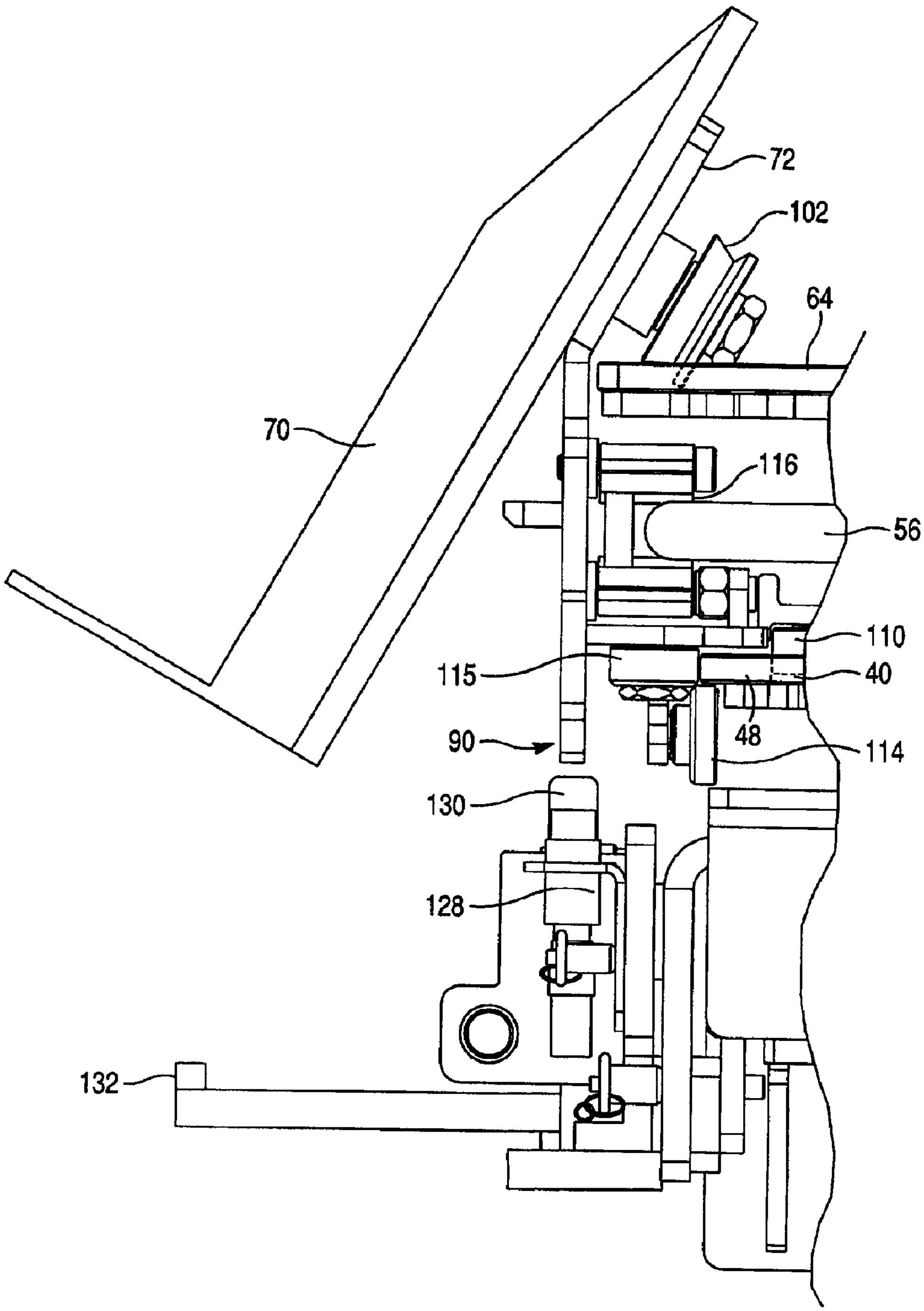
FIG. 6 is a side elevational view of the buffer of FIG. 1 showing a stop for preventing the movement of the carriers in a non-engaged position.
Figure 7:
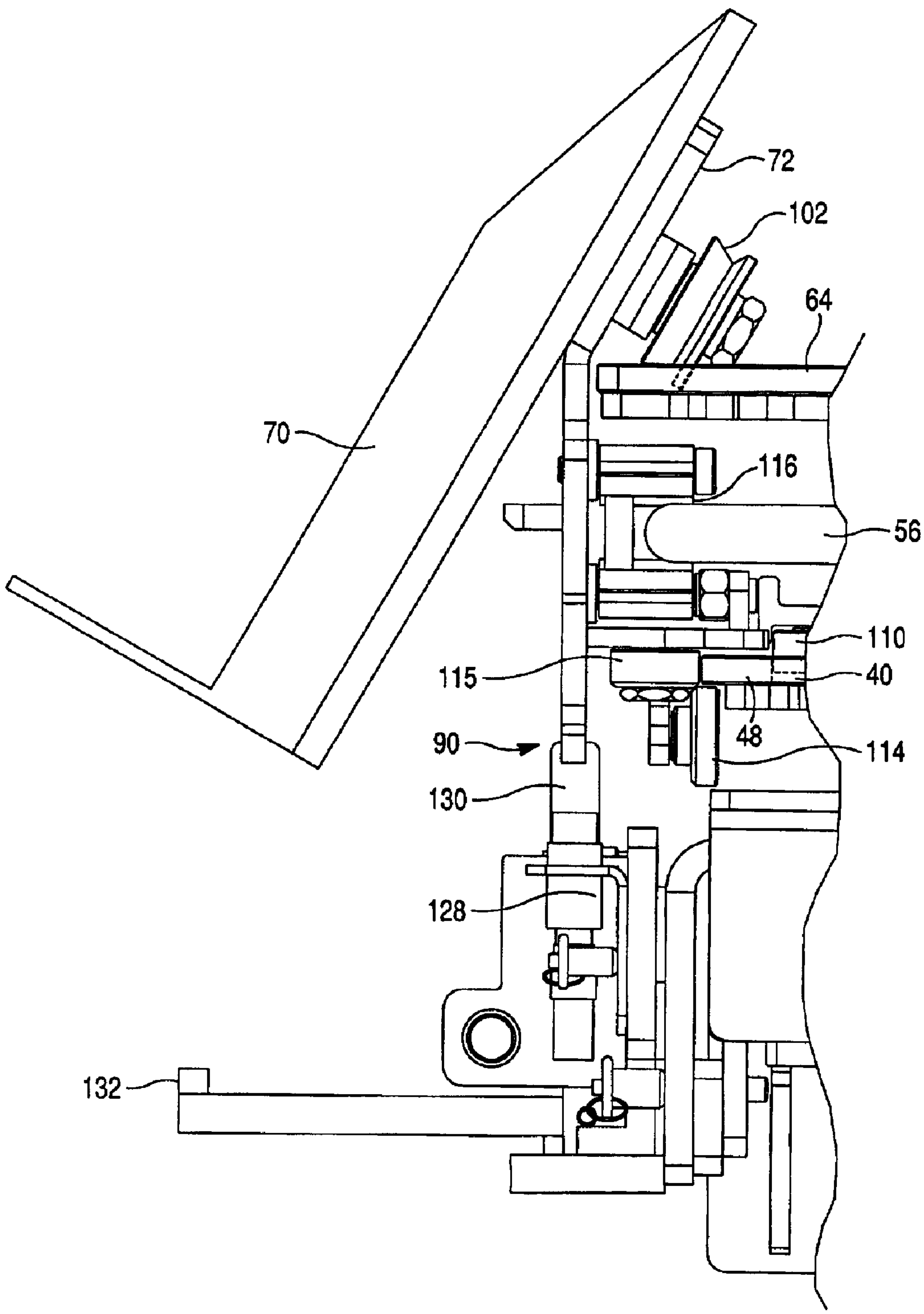
FIG. 7 is a side elevational view of the buffer and stop of FIG. 6 showing the stop in an engaged position.

A first solenoid-actuated stop 128 is mounted on frame 12 with a trolley-engaging portion 130 shiftable between a first, release position, shown in FIG. 6, below the lower ends 90 of the trolley bottom portions 88 and a second, stop, position, shown in FIG. 7, where the trolley engaging portion 130 blocks a path of the trolley 72 by forming a stop against which the lower ends 90 of the trolleys impact when the stop 128 is in its stopping position. A second, separately controllable, solenoid-actuated stop 134 is provided on the other side of the buffer device.

Figure 9:
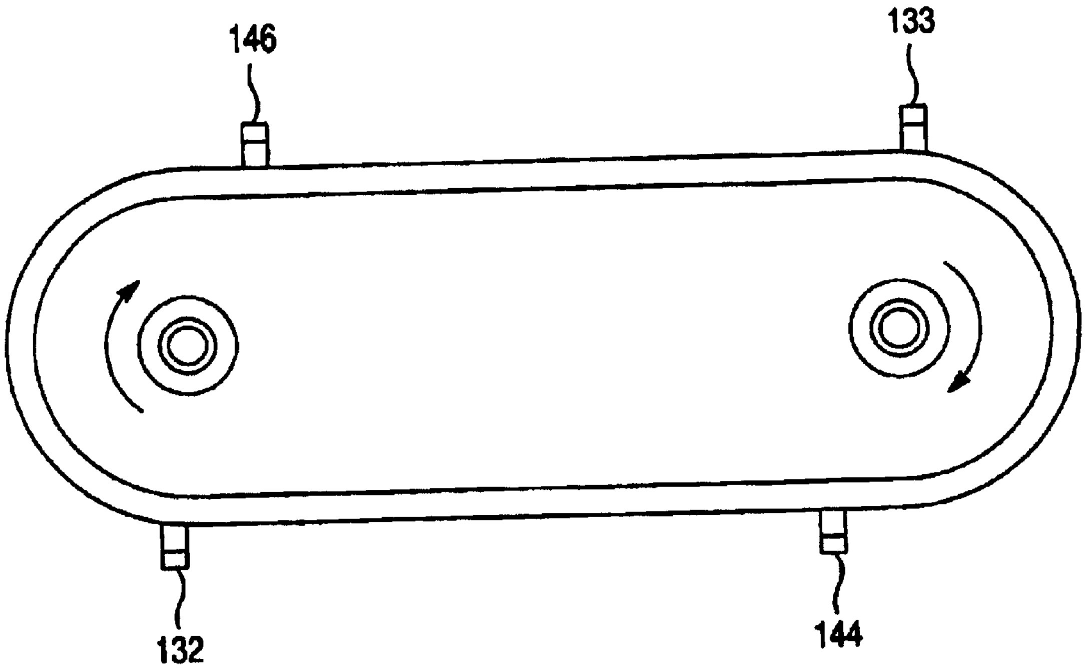
FIG. 9 is a top plan view of the buffer device with the trays removed to show the positions of several sensors.

The shifting of the stops between stopping and releasing positions is controlled by a controller 136, operably coupled to sensors 132 and 133 mounted on frame 12 below the tray bottom walls 94, as best shown in FIGS. 5 and 9. These sensors are used to count the number of trays passing thereby. The controller 136 monitors the number of trays 70 passing over each of the sensors 132 or 133, and causes the first stop 128 to shift to its stop position when a predetermined number of trays has passed. For example, when the buffer receives four stacks of patties at a time from a stacker, the trays 70 will be released in groups of four. Similarly, when stacks are removed in groups of three, the controller 136 shifts the second stop 134 into the blocking position and only allows the trays 70 to pass in groups of three. The operation of the stops 128 and 134 is coordinated with the operation of the stacker and stack transfer mechanism so that, in the embodiment described herein, at least four empty trays are always available to receive incoming stacks of patties and that at least three stacks of patties are present at the second stop 134 to be removed by a stack transfer device. An optical sensor 135 is also provided for detecting patties on the trays as they approach the loading position. Since these trays 70 should all be empty, an alarm occurs or the system shuts down when full trays are seen approaching the loading position.

As best shown in FIG. 9, two additional sensors 144 and 146 are also provided to help ensure that enough trays 70 are present upstream of stop 128 to receive incoming stacks of patties and that the correct number of stacks of patties are available for removal by a stack transfer device. Thus, for example, as sensor 128 is counting the passage of four trays 70, sensor 144 upstream of sensor 128 is counting the passage of empty trays toward sensor 132 and stop 128. Controller 136 is preferable coupled to the controller for a transfer device that brings stacks of patties to the buffer device 10 and configured so that stacks of patties will not be transferred to buffer device 10 until sensor 144 has detected the passage of four trays 70. Thus, in the event that a problem arises that prevents four empty trays from lining up behind stop 128, the transfer device will not attempt to transfer stacks of patties to the buffer device 10. This reduces the likelihood that patties will be dropped or otherwise mishandled during processing. In a similar manner, sensor 146 counts trays 70 approaching sensor 133, and as sensor 133 is counting the release of three empty trays 70, for example, sensor 146 is counting approaching trays to ensure that at least three full trays are present at stop 134 and that at least three stacks are available for removal. Controller 136 is preferably connected to the controller for the downstream stack transfer device and prevents stacks from being removed from the trays stopped at stop 134 until three stacks are present for removal. The number of stacks arriving at and leaving the buffer device 10 can be varied, and the position of sensors 144, 146 is adjustable so that these sensors can be placed near the location where the last of a given group of trays 70 will be found when the system is operating properly.

In a second embodiment, sensors 132 and 133 are used both to count the number of trays passing thereby and to detect whether the tray adjacent the sensor is full or empty, based upon whether slot 76 is blocked. The controller 136 monitors the status of the trays 70 passing over each of the sensors, and causes the first stop to shift to its stop position whenever an empty tray is detected and to shift to its release position when a full tray is detected. Similarly, controller shifts the second stop into the blocking position when a full tray is detected by sensor 133 and into the releasing position when actuated in an opposite manner, that is, set to prevent the passage of full trays while allowing empty trays to pass.

In operation, motor 26 drives drive belt 30, turning first and second wheels 32, 34 and rotating shafts 40 and wheels 52 mounted thereon. This in turn causes drive belt 56 to move continuously about the periphery of the buffer between plates 42 and 58. The carrier trolleys 72 are clamped to belt 56 tightly enough that they are pulled about the peripheries of the upper and lower plates by the movement of the belt. The trolleys are guided by the engagement of trolley wheels 102 with upper plate raised rail 64 and the engagement of guide wheels 110, 112 and 114 with the peripheral portion 46 of lower plate 42. Stops 128 and 134 are selectively moved into and out of the path of travel of the trolleys and, when positioned in a stopping position, prevent trolleys from moving past the stops. The motor 26 continues to operate at a continuous speed, however, sliding belt 56 through clamps 116 even when all trolleys are prevented from moving by the positions of the stops. The urethane from which belt 56 is formed is sufficiently wear resistant that it provides reliable operation even after many hours of continuous use. And, as the relative positions of clamp upper member 118 and lower member 122 are adjustable, the clamps can be repositioned in the event that the diameter of belt 56 decreases slightly after a long period of use to maintain the proper pressure on the belt.

The operation of the subject system will now be described with particular reference to FIGS. 8*a*–*h* which shows the system set up for use with a patty stacker that forms four stacks of patties simultaneously which patties must be packed in boxes that are three patties wide. Thus the buffer will receive stacks of patties four at a time from a first direction, shown by arrows 138 in FIG. 8A, on a first side of the buffer and present them for removal three stacks at a time on a second side of the buffer where they are removed in a the direction of arrows 140 in FIG. 8C.

Figure 8A:
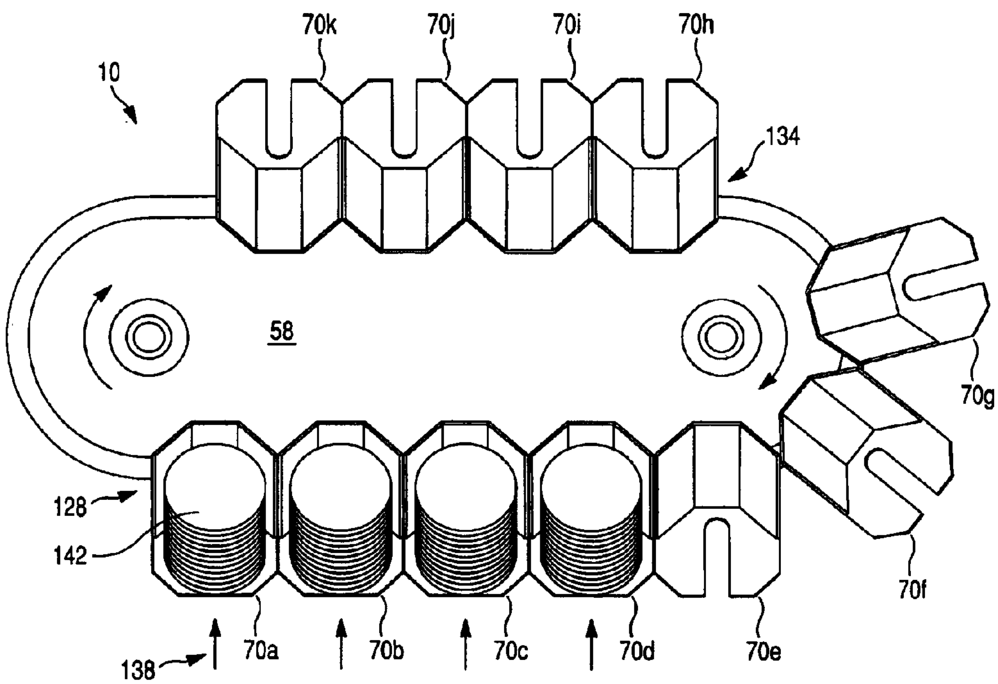
FIGS. 8*a–h* are top plan views of the buffer of FIG. 1 showing the locations of full and empty trays around the periphery of the buffer as the buffer is used according to the method of the present invention.

FIG. 8A shows four trays 70*a*, 70*b*, 70*c* and 70*d* on a first side of buffer 10 which trays have just received four stacks 142 of hamburger patties from a transfer mechanism (not shown). Controller 136 causes stop 128 to move between blocking and releasing positions in order to release carriers in groups of four at predetermined intervals. After four stacks of patties are received in trays 70*a*–70*d*, stop 128 shifts to its release position and allows these carriers to pass. The fifth carrier, 70*e*, which is empty, and the carriers behind it, are stopped by stop 128 for a predetermined period of time, a period long enough for theses carriers to receive four more stacks of patties from the stacking machine.

Figure 8B:
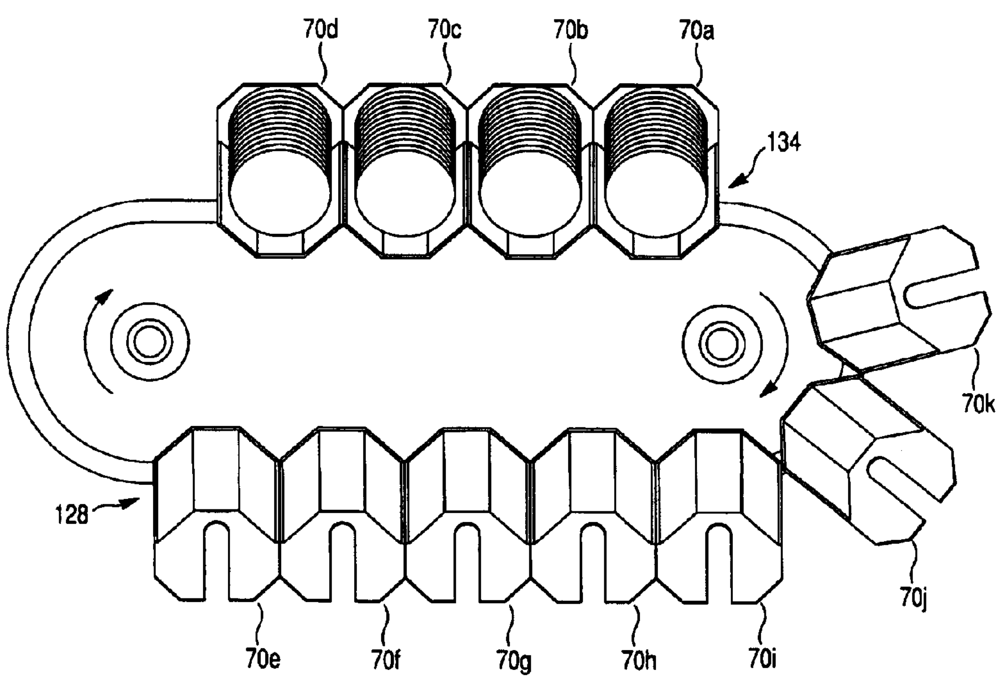

As shown in FIG. 8B, additional carriers 70*f* and 70*g* impact against stopped carrier 70*e* and are held in this position as belt 56 slips through clamps 116 on each trolley. Carriers 70*e–g* will remain in this position for a predetermined amount of time. Meanwhile, carriers 70*a–d* have been carried around buffer 10 by belt 56 toward a second stop 134 that blocks the path of the trays, and tray 70*a* impacts against the second stop. Trays 70*b–d* impact against stopped tray 70*a* and are also brought to a stop with drive belt 56 sliding freely through clamps 116 on each of the stopped trays.

Figure 8C:
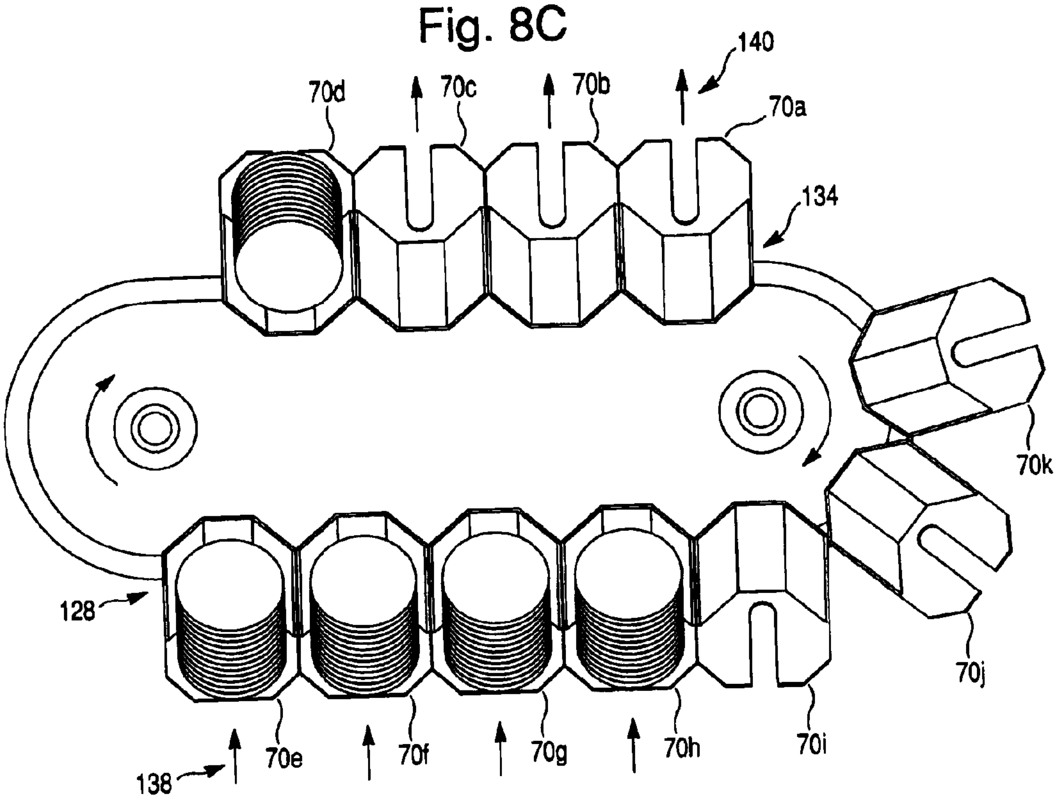
Figure 8D:
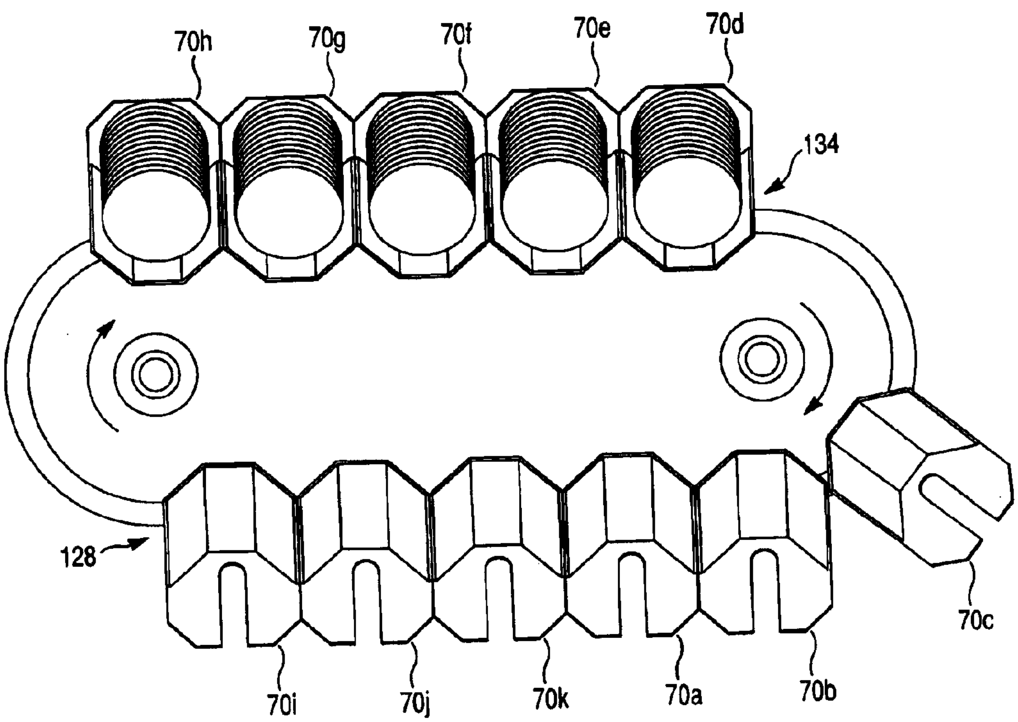

As shown in FIG. 8C, a second transfer device, not shown, removes three stacks of patties from carriers 70*a*, 70*b* and 70*c* in the direction of arrows 140, and the first transfer device places four additional stacks of patties on carriers 70*e*, 70*f*, 70*g* and 70*h* on the first side of the buffer. After a predetermined time, carriers 70*a–c* will be empty, and therefore the controller cause these three trays to be released, while the next tray (the last full tray) is stopped. Full carriers 70*e*, 70*f*, 70*g* and 70*h* are released by first stop 128 in FIG. 8C and moved around the buffer until they impact full carrier 70*d* held up at second stop 134 resulting in the positioning of trays shown in FIG. 8D.

Figure 8E:
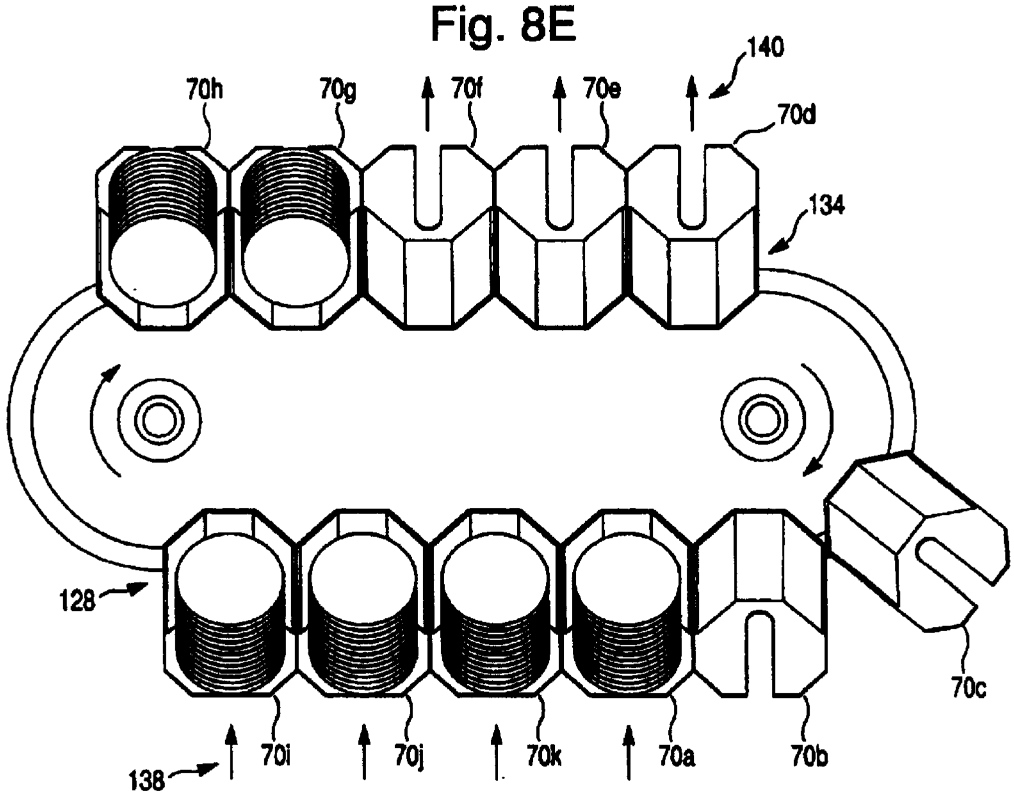
Figure 8F:
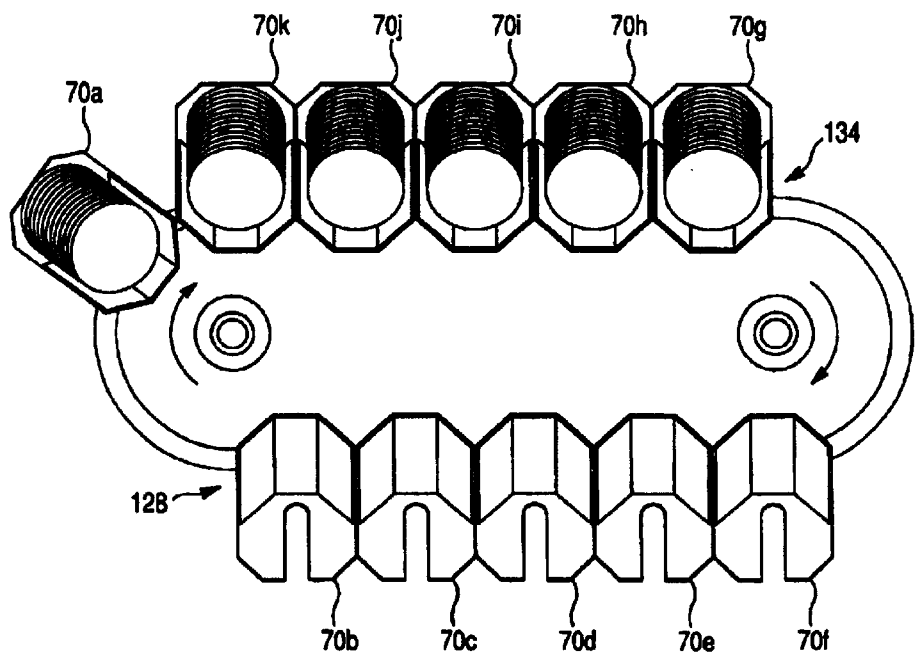
Figure 8G:
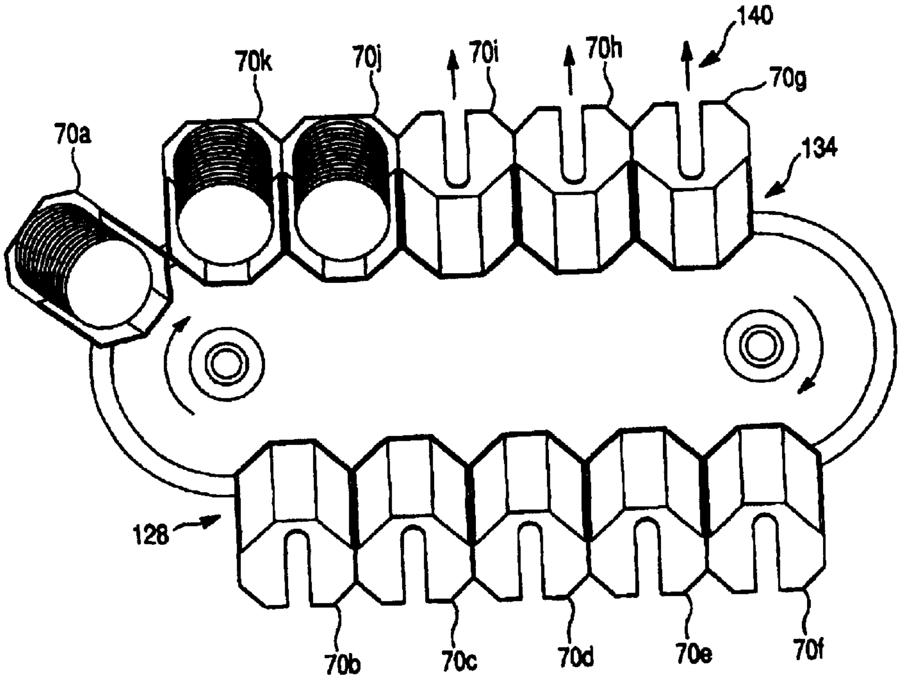
Figure 8H:
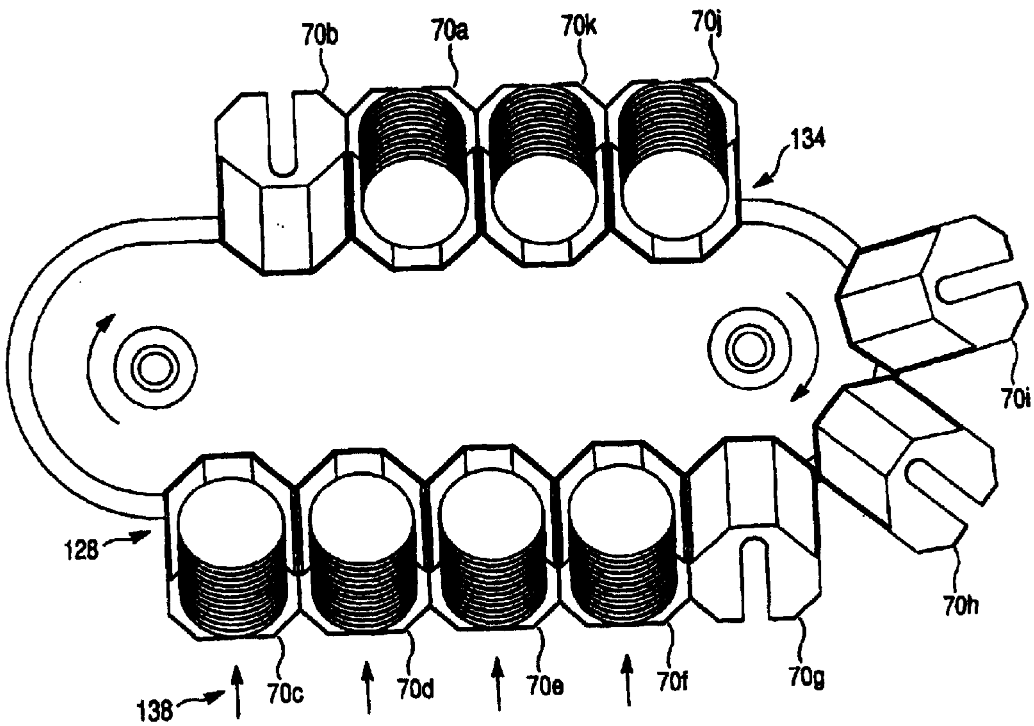

FIG. 8E shows that three stacks of patties have been removed from carriers 70*d*, 70*e* and 70*f* and that additional stacks of patties have been placed on carriers 70*i*, 70*j*, 70*k* and 70*a*. Four full carriers are released by stop 128 and three empty carriers are released by stop 134 as described above resulting in the arrangement of carriers shown in FIG. 8*f*. As shown in FIG. 8G, three additional stacks of patties are removed from trays 70*g*, 70*h* and 70*i* and these now-empty carriers are also released. Full carriers 70*j*, 70*k* and 70*a* remain stopped at stop 134. Three additional stacks of patties will be removed from carriers 70*a*, 70*k* and 70*j* as shown in FIG. 8H while an additional four stacks are added to trays 70*c*, 70*d*, 70*e* and 70*f* at the first side of the buffer, and from there the process continues repeatedly as described above.

The above invention has been described above in terms of a preferred embodiment. However, obvious changes and additions to the invention will become apparent to those skilled in the relevant arts upon a reading of the foregoing disclosure. For example, while the trolleys are described as being connected to a urethane belt in a manner that allows the belt to slide through the trolleys when the motion of a trolley is blocked, a plurality of separately controllable clamps could be used on each carrier to independently control whether a given carrier is connected to a drive belt. Additional sensors could also be added to provide additional information on the position and status of carriers as they travel around the buffer. And, while the buffer has been described in terms of reducing a flow of four incoming stacks of patties to three outgoing stacks of patties, the number of incoming patties could be changed, the number of outgoing patty stacks could be greater than the number of incoming stacks or the incoming and outgoing stacks could be equal in number without departing from the scope of this invention. It is intended that all such obvious changes and additions be included within the scope of this invention to the extent that they are defined by the several claims appended hereto.

What is claimed is:

1. A system for buffering a flow of stacks between a first location and a second location comprising:

a frame having an entry end proximate the first location and an exit end proximate the second location;

a continuously operating drive of a fixed operative length;

a plurality of carriers supported by said frame and connected to said drive to allow controlled movement about said frame;

a first stop at said entry end for stopping a plurality of said carriers at the first location and to allow at least one product to be deposited on each of the stopped carriers;

a second stop at said exit end for stopping a plurality of said carriers and to allow the at least one product to be removed from at least some of the stopped carriers at said the second location; and a controller operatively connected to said first stop for selectively engaging and disengaging said first stop to stop movement of a plurality of said carriers and to allow said carriers to pass from said first location in groups of a first number, said controller being operatively connected to said second stop for selectively engaging and disengaging said second stop to stop movement of a plurality of said carriers and allow said carriers to pass from said second location in groups of a second number, wherein said second number is different from said first number;

at least two sensors operatively associated with said controller for determining the number of camers at said first and second locations and interacting with said controller to cause said first and second stops to be independently engaged and disengaged from said carriers thereby controlling the number of camers at said first and second locations.

2. The system of claim 1 wherein said carriers comprise tray portions for receiving stacks of discrete objects and trolley portions connected to said tray portions and mounted on said frame.

3. The system of claim 2 wherein said tray portions include a support wall angled with respect to vertical.

4. The system of claim 3 wherein each of said carriers include a connector for connecting each of said carriers to said drive.

5. The system of claim 4 wherein said drive comprise a continuous element moved in a closed loop by a drive motor.

6. The system of claim 5 wherein said connector comprises an adjustable clamp.

7. The system of claim 6 wherein said continuous element comprises a drive belt.

8. The system of claim 6 wherein said drive belt has a circular cross section.

9. The system of claim 8 wherein said drive belt is formed from urethane.

10. The system of claim 1 wherein said frame comprises a support having first and second linear carrier supporting portions connected by first and second arcuate carrier supporting portions.

11. The system of claim 10 wherein said first linear carrier supporting portion is at said first location and said second linear carrier supporting portion is at said second location.

12. The system of claim 6 wherein said continuous element slides through said clamp when movement of said carrier is stopped by one of said stops.

13. The system of claim 12 wherein said clamp includes first and second fixed clamp elements.

14. The system of claim 13 wherein said clamp includes first and second adjustable clamp elements.

15. The system of claim 1 wherein said at least two sensors includes one first sensor for counting carriers approaching said first stop.

16. The system of claim 15 wherein said at least one first sensor detects the presence of an object on said carrier adjacent said first stop.

17. The system of claim 15 wherein said at least two sensors includes at least one second sensor for detecting the presence of a carrier approaching said second stop.

18. The system of claim 17 wherein said at least one second sensor detects the presence of an object on the carrier adjacent said second stop.

19. The system of claim 7 wherein a first force is required to move said belt with respect to said clamp and wherein said drive motor generates a second force greater than said first force.

20. A buffer comprising:

a support frame;

a platform having a periphery mounted on said support frame;

a guide extending around said periphery;

a drive belt mounted adjacent said platform along said periphery;

a drive operatively coupled to said drive belt for moving said drive belt;

a plurality of carriers supported by said platform, each of said carriers including a first member engaging said guide and a second and third members engaging said drive belt between said second and third members so that said drive belt moves said carriers about said periphery of said platform;

a first sensor at a first location for counting the number of carriers passing the first location;

at least one stop shiftable between a first position in a path of travel of the carriers around said platform and a second position outside the path of travel of the carriers around said platform; and, a controller operatively coupled to said first sensor for controlling the position of said at least one stop.

21. The buffer of claim 20 wherein said platform comprises an upper platform and a lower platform and wherein said drive belt is located between said upper platform and said lower platform.

22. The buffer of claim 20 wherein said first member comprises at least one guide wheel.

23. The buffer of claim 22 wherein said at least one guide wheel comprises a first guide wheel engaging the guide on said upper platform and at least one guide wheel engaging a guide on said lower platform.

24. The buffer of claim 20 wherein said second member comprises a first portion of an adjustable clamp and said third member comprises a second portion of said adjustable clamp.

25. The buffer of claim 20 including an optical sensor for detecting the presence of objects on said plurality of carriers.

26. The buffer of claim 20 wherein said plurality of carriers each include a projecting portion and wherein said at least one stop is capable of engaging the projecting portion of a given carrier when said given carrier is proximate said at least one stop.

27. The buffer of claim 20 wherein said at least one stop comprises a plurality of stops.

28. The buffer of claim 20 including a second sensor for counting the number of trays approaching the first location.

* * * * *